United States Patent [19]
Babb et al.

[11] Patent Number: 5,274,800
[45] Date of Patent: Dec. 28, 1993

[54] AUTOMATIC SIGNAL CONFIGURATION

[75] Inventors: Samuel M. Babb; Martin L. Speer, both of Fort Collins, Colo.

[73] Assignee: Hewlett-Packard Company, Palo Alto, Calif.

[21] Appl. No.: 659,205

[22] Filed: Feb. 22, 1991

[51] Int. Cl.[5] .............................................. G06F 11/30
[52] U.S. Cl. ................................ 395/575; 364/926.91; 364/927.93
[58] Field of Search ................... 395/575; 364/926.91, 364/927.93, 940.2, 940.61, 240.1, 240.5

[56] References Cited

U.S. PATENT DOCUMENTS 4,825,438 4/1989 Bennett et al. ...................... 371/8.2

Primary Examiner—Vincent P. Canney
Attorney, Agent, or Firm—Guy J. Kelley

[57] ABSTRACT

A system and method are disclosed for automatically configuring the interconnection of circuit boards in slots on the backplane of a computer. Some signal lines, such as bus grant and interrupt acknowledge signals, must be daisy-chained, or connected in series through the circuit boards collectively. However, if a circuit board is not present, then the daisy-chain is broken. For each slot to be monitored in the backplane, the present invention envisions implementing a generator, a valid logic level detector and a signal selector. The generator imposes an invalid logic signal onto an output connector of a slot to derive an input for the valid logic level detector. Based upon the input, the detector determines whether a circuit board resides in the slot. Accordingly, the detector adjusts the signal selector to either bypass the slot or connect the slot, as well as the present circuit board, to the daisy-chain.

20 Claims, 7 Drawing Sheets

AUTOMATIC SIGNAL CONFIGURATION

BACKGROUND OF THE INVENTION

I. Field of the Invention

The present invention relates generally to computer architectures and, more particularly, to configuring the interconnection of circuit boards connected to a backplane of a microcomputer.

II. Related Art

Conventionally, microcomputer architectures are designed with a backplane to which printed circuit boards are connected. The backplane itself is a circuit board having external connectors and internal predetermined signal paths. In a sense, the backplane can be conceptualized as the main interface structure.

Circuit boards interfaced to the backplane can take many forms. The circuit boards can comprise a data processing device ("CPU board"), a data storage device ("memory board"), and/or a data input/output (I/O) device ("I/O board"), as well as interface logic and other electronic elements.

The circuit boards are interfaced to the backplane via slots. A slot is a position on the backplane where a circuit board can be physically inserted and thereby electrically connected to the signal paths on the backplane.

Oftentimes, microcomputer architectures require that a "daisy-chain" be maintained collectively among certain electronic lines of the circuit boards. A daisy-chain is a special type of signal line that connects the circuit boards in series, as opposed to in parallel. A daisy-chain is used to propagate a signal level from circuit board to circuit board in series, starting with a first slot in the backplane and ending with the last slot in the backplane. In contrast, a parallel connection simultaneously presents the signal to all circuit boards without allowing a board to intercept and hold the signal.

An example of a high performance industry standard bus which implements daisy-chains is the VMEbus, which was specified by IEEE standard 1014-87 based upon the VMEbus specification released by the VMEbus International Trade Association in August 1982. In this regard, see *The VMEbus Specification*, VMEbus International Trade Association (VITA), Document No. SH11544 (Mar. 28, 1988), which is incorporated herein by reference.

Specifically, the VMEbus has certain arbitration bus lines on its backplane. The arbitration bus lines comprise four daisy-chain lines, collectively referred to as "bus grant daisy-chains." In addition, the VMEbus requires one interrupt acknowledge daisy-chain on the backplane. Thus, the VMEbus comprises a total of five daisy-chain lines.

If a backplane slot is not occupied by a circuit board and if other circuit boards exist farther down the daisy-chain, then conventionally jumpers or some other bridge device must be installed at the empty slot to pass the daisy-chain signal through the slot opening and thereby maintain the continuity of the daisy-chain.

Some attempts have been made to implement an automatic mechanical switching device situated inside the backplane connectors. When a circuit board is inserted into the backplane, the mechanical switching device serves to maintain the daisy-chain in the backplane as usual. However, when a circuit board is not inserted into a backplane slot, then the mechanical switching device serves as a jumper across the pertinent connector, thereby maintaining the continuity of the daisy-chain.

The conventional methods for maintaining the daisy-chain lines in the absence of circuit boards are problematic. The need to introduce jumpers or other bridge devices across the circuit board connectors increases the complexity of assembly and does not provide for a user friendly computer. Moreover, the method utilizing the automatic mechanical switching device has been deemed unreliable and/or impractical in the industry. It is susceptible to mechanical jamming and other undesirable electrical malfunctions.

Consequently, a strong need exists in the industry for a reliable and automatic way of configuring various circuit boards in a computer architecture to thereby maintain the continuity of daisy-chain lines.

SUMMARY OF THE INVENTION

The present invention provides a system and method for automatically and reliably configuring various circuit boards in a computer architecture to thereby maintain the continuity of daisy-chain lines.

In accordance with the present invention, a system comprises an invalid logic level bias generator and a valid logic level detector. The invalid logic level bias generator is adapted to continuously drive an invalid logic signal onto a digital line. Moreover, the invalid logic signal is overdriven by any logical signal on the digital line.

The valid logic level detector is adapted to determine whether or not any logical signal exists on the digital line. If a logical signal is present, then the conclusion is that the digital line is connected to a digital device. In the alternative, if the invalid logic signal is present, then it is assumed that the digital line is not connected to a digital device.

In accordance with another aspect of the present invention, the digital line to be monitored is an output of a slot in the backplane of a computer. Thus, it can be determined whether or not a circuit board is plugged into a slot. Furthermore, a signal selector is connected to the valid logic level detector. The signal selector maintains daisy-chain signal lines through the circuit boards by either bypassing a slot when no circuit board is present or connecting the slot to the daisy-chain when a circuit board is present.

FEATURES AND ADVANTAGES OF THE INVENTION

The present invention overcomes the deficiencies of the prior art, as noted above, and further provides for the following additional advantages.

First, the present invention automatically configures the printed circuit boards in a computer architecture so as to maintain any number of daisy-chain lines. The result is a less complex, reliable, easily assembled, and user friendly computer architecture.

Second, the present invention is applicable to computer architectures utilizing either current or voltage levels to define logical states.

Third, the present invention may be implemented with simple and inexpensive commercially available circuit elements.

Fourth, the present invention is applicable in any application requiring the physical detection of a digital element.

Further advantages of the present invention will become apparent to one skilled in the art upon examination of the following drawings and the detailed description. It is intended that any additional advantages be incorporated herein.

BRIEF DESCRIPTION OF THE DRAWINGS

The present invention, as defined in the claims, can be better understood with reference to the text and to the following drawings.

DETAILED DESCRIPTION OF THE PREFERRED EMBODIMENT

Figure 1:
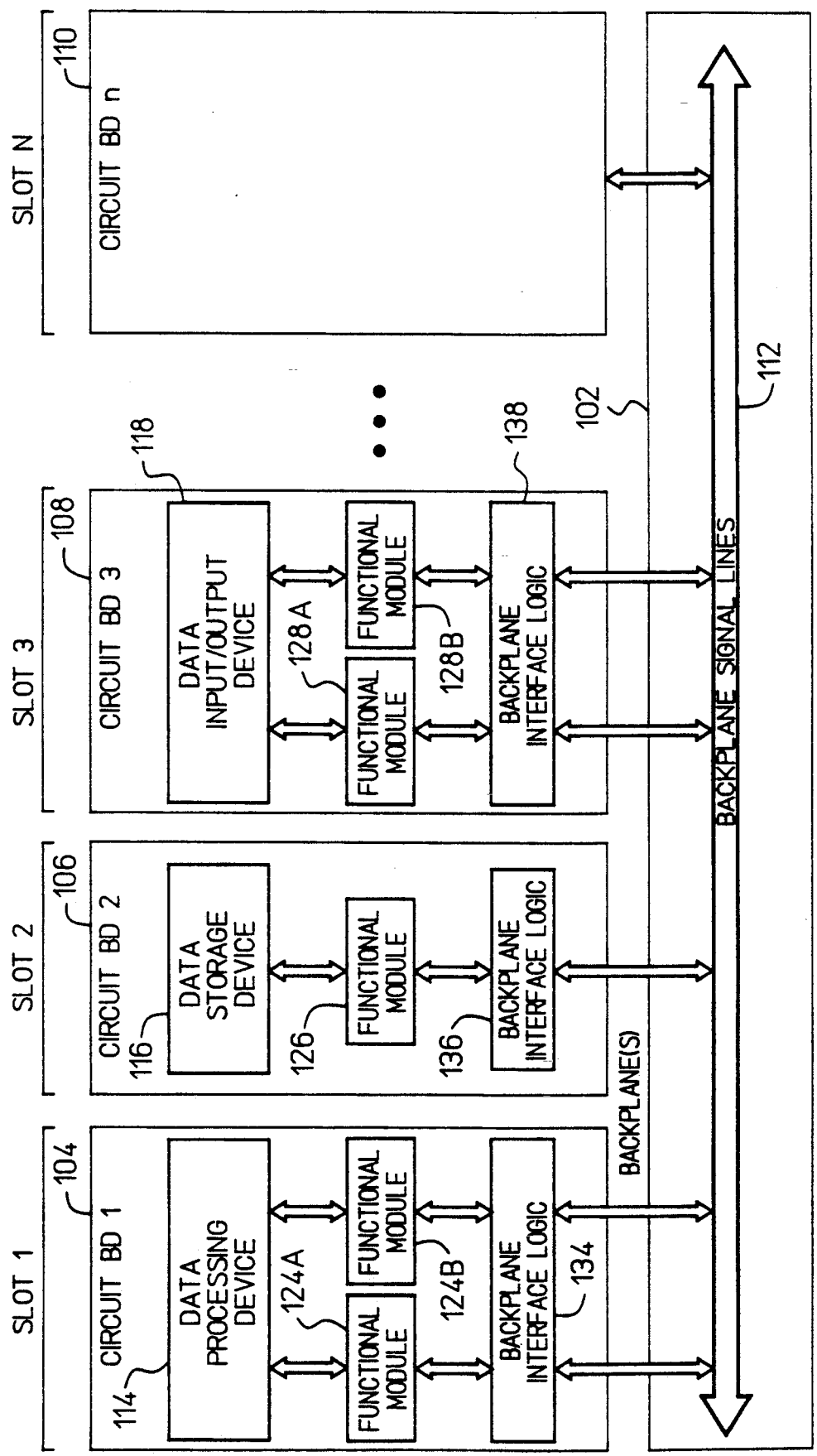
FIG. 1 is a block diagram of an exemplary computer architecture in which the present invention may be implemented.

FIG. 1 is a block diagram of a computer architecture in which the present invention may be implemented. The computer architecture comprises a backplane 102 to which any number and variety of printed circuit boards (circuit board) can be connected.

As shown, n circuit boards 104–110 are interfaced to backplane signal lines 112 of the backplane 102. As merely an arbitrary example, the circuit board 104 in slot 1 is illustrated as a "CPU board" having a data processing device 114, the circuit board 106 in slot 2 as a "memory board" having a data storage device 116, and the circuit board 108 in slot 3 as an "input/output (I/O) board" having a data I/O device 118. All variations of the computer architecture as shown, including a different configuration/ordering of the circuit boards collectively and/or different types of circuit boards, is intended to be included herein.

In the preferred embodiment, the backplane 102, backplane signal lines 112, functional modules 124–128, and backplane interface logic 134–138 are defined by the VMEbus specification released by the VMEbus International Trade Association in August 1982. In this regard, see *The VMEbus Specification*, VMEbus International Trade Association (VITA), Document No. SH11544 (Mar. 28, 1988), which is incorporated herein by reference.

As defined by the VMEbus specification, the VMEbus has certain arbitration bus lines within the backplane signal lines 112. The arbitration bus lines handle bus interrupts. The arbitration bus lines comprise four daisy-chain "bus grant" lines, pursuant to the VMEbus specification. Signals entering each of the n circuit boards 104–110 on the bus grant lines are called "bus grant in"lines (BG×IN*, where $0 \leq ×3$ and where x is the bus grant signal number; "*" indicates active at a low logical level), while signals leaving each circuit board are called "bus grant out" lines (BG×OUT*).

Figure 2:
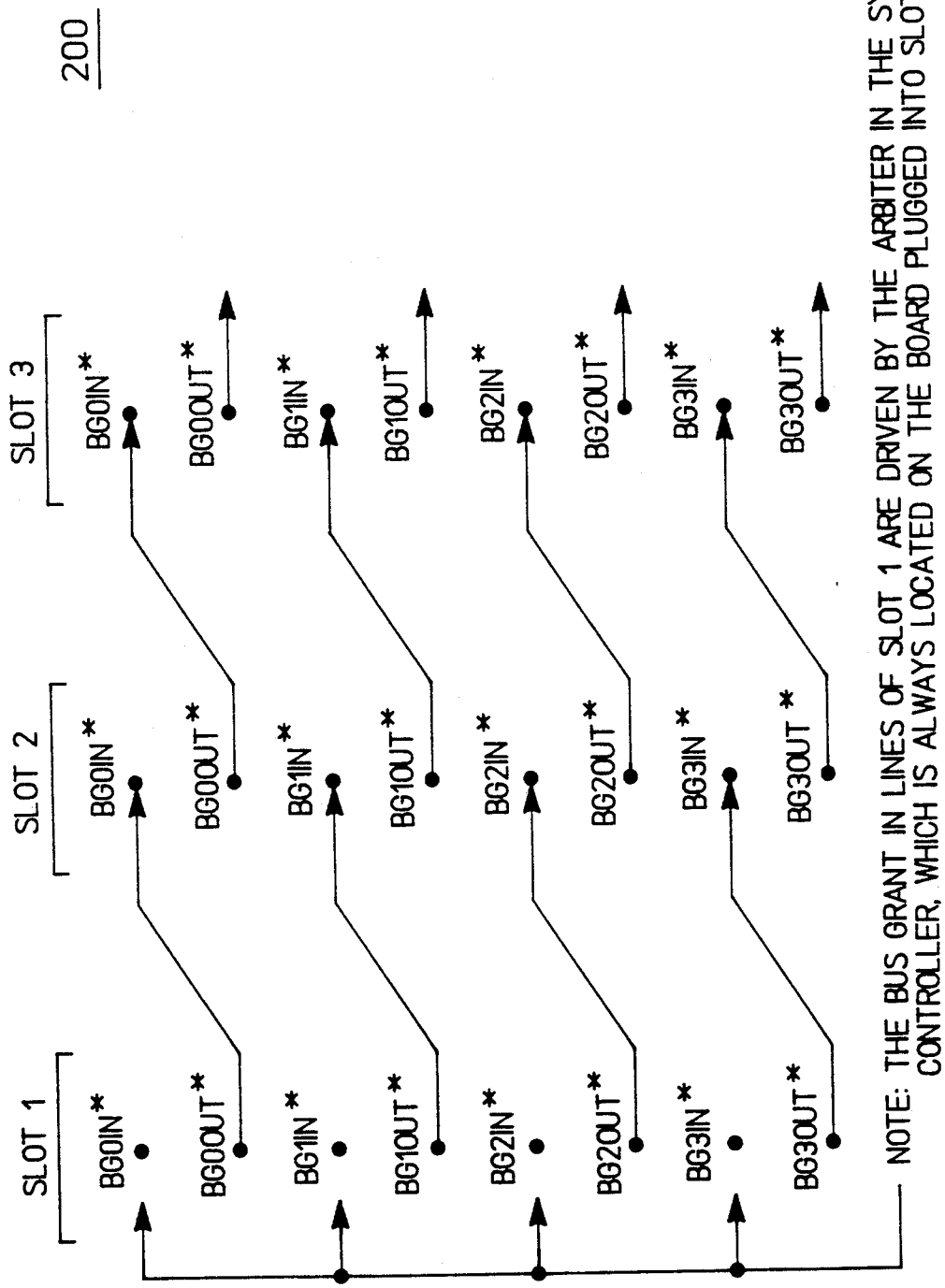
FIG. 2 is an illustration of daisy-chain bus grant lines.

FIG. 2 is an illustration of the daisy-chain concept specifically in regard to the bus grant lines. In accordance with the daisy-chain concept, the lines that leave slot n as BG×OUT* enter slot n+1 as BG×IN*. Note that the bus grant lines of slot 1 are driven by the arbiter of the system controller, which is located on the circuit board plugged into slot 1, pursuant to the VMEbus specification. The arbiter is essentially a functional module that accepts bus requests from throughout the computer architecture and grants control (one requestor at a time) of a data transfer bus (DTB; not specifically shown) within the backplane signal lines 112.

If a slot is not occupied by a circuit board, then the daisy-chain is broken. Consequently, if other circuit boards exist farther down the bus grant daisy-chain, then these circuit boards will not receive signals from the bus grant daisy-chain. Conventionally, to remedy the break in the chain, jumpers or some other bridge devices are installed at the empty slot to thereby pass through the daisy-chain signal.

Figure 3:
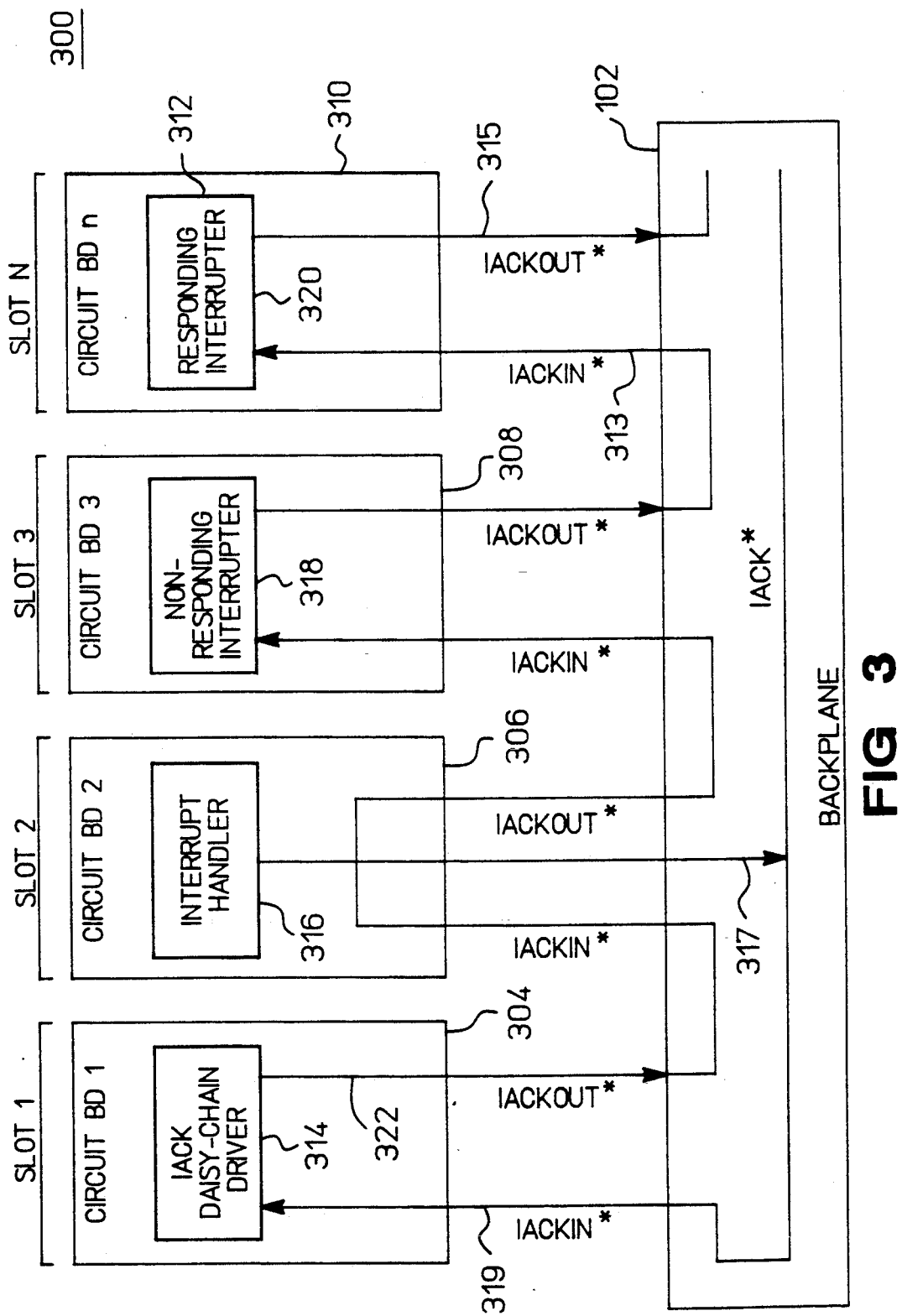
FIG. 3 is an illustration of daisy-chain interrupt acknowledge lines.

In addition, the VMEbus specification requires one interrupt acknowledge daisy-chain. The interrupt acknowledge daisy-chain is discussed below with reference to FIG. 3.

The backplane signal lines 112 comprises a priority interrupt bus (not shown). The priority interrupt bus has seven prioritized interrupt request lines, each of which can be shared by more than one interrupter. An interrupter is a functional module, or generally a circuit board having the functional module, which generates an interrupt request on the priority interrupt bus, and then provides status and/or identification information upon request. The interrupt acknowledge daisy-chain ensures that only one interrupter responds to an interrupt acknowledge cycle. As shown, the daisy-chain line passes through each circuit board between the first circuit board 304 and the last circuit board 310. The interrupt acknowledge signals that leave a slot as IACKOUT* enter the next slot as IACKIN*.

Operationally, the interrupt acknowledge daisy-chain is implemented as follows. F i r s t , a n interrupter 312 on circuit board 31? drives an interrupt request line (one of seven; not shown) to a low logical level, thereby indicating a desire to request an interrupt. The interrupter 312 will wait for a falling edge to arrive at its IACKIN* daisy-chain input 313. Only upon receiving this falling edge does the interrupter 312 respond to the interrupt acknowledge cycle. Further, upon receipt, it will not pass the falling edge down the daisy-chain via IACKOUT* daisy-chain output 315, thus preventing other interrupters from responding to the interrupt acknowledge cycle.

An interrupt handler 316, shown arbitrarily on circuit board 306, detects the interrupt request generated by the interrupter 312. Moreover, the interrupt handler 316 acknowledges by generating an IACK* signal on the backplane 102, as shown by an arrow 317. Essentially, the interrupt handler 316 is seeking status and/or identification information from the interrupter 312. Worth noting is that the interrupt handler 316 can reside on any of the n circuit boards, either alone or with other functional modules.

Further, an IACK daisy-chain driver 314, which is a constituent of the system controller in slot 1, receives the IACK*. The IACK daisy-chain driver 314 then initiates an interrupt acknowledge daisy-chain signal via IACKOUT* daisy-chain output 322. The signal will travel through the daisy-chain to until an interrupter seizes control of it.

As shown, the daisy-chain signal passes through circuit board 306 without consideration by the interrupt handler 316 (due to its conventional design). Other functional modules could be present on this circuit board which would consider or monitor the daisy-chain signal.

Next, the daisy-chain signal enters, is considered by, and then leaves the functional module present on the circuit board 308. Finally, the daisy-chain signal enters the interrupter 312, where it is seized.

Similar to the bus grant daisy-chain, if a slot is not occupied by a circuit board, then the interrupt acknowledge daisy-chain is broken. Consequently, if other circuit boards exist farther down the bus grant daisy-chain, then these circuit boards will not receive signals from the interrupt acknowledge daisy-chain. Conventionally, to remedy the break in the chain, jumpers or some other bridge devices are installed at the empty slot to thereby pass through the daisy-chain signal.

Figure 4A:
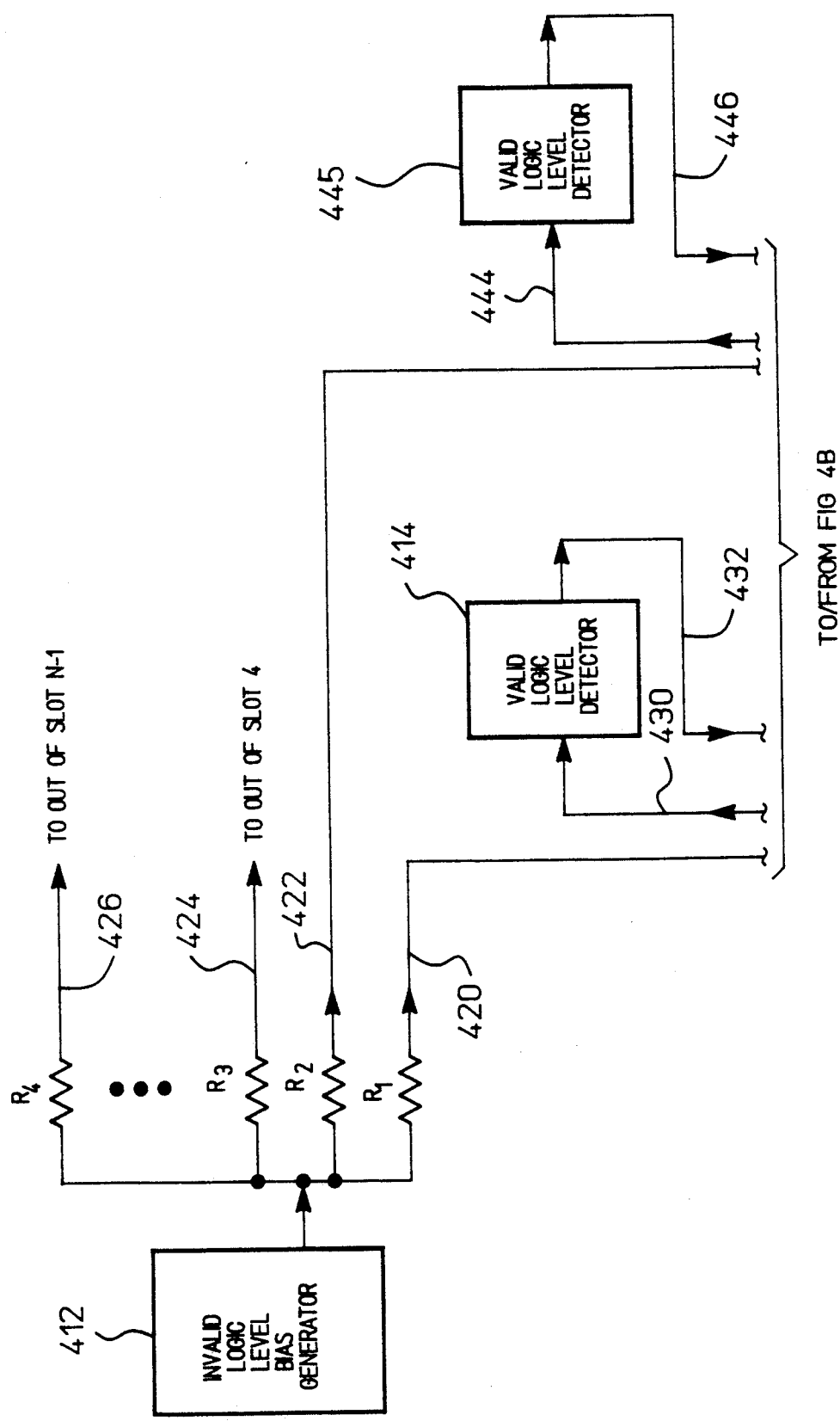
FIGS. 4A and 4B collectively show a high level block diagram of the present invention comprising an invalid logic level bias generator, a valid logic level detector, and a signal selector.
Figure 4B:
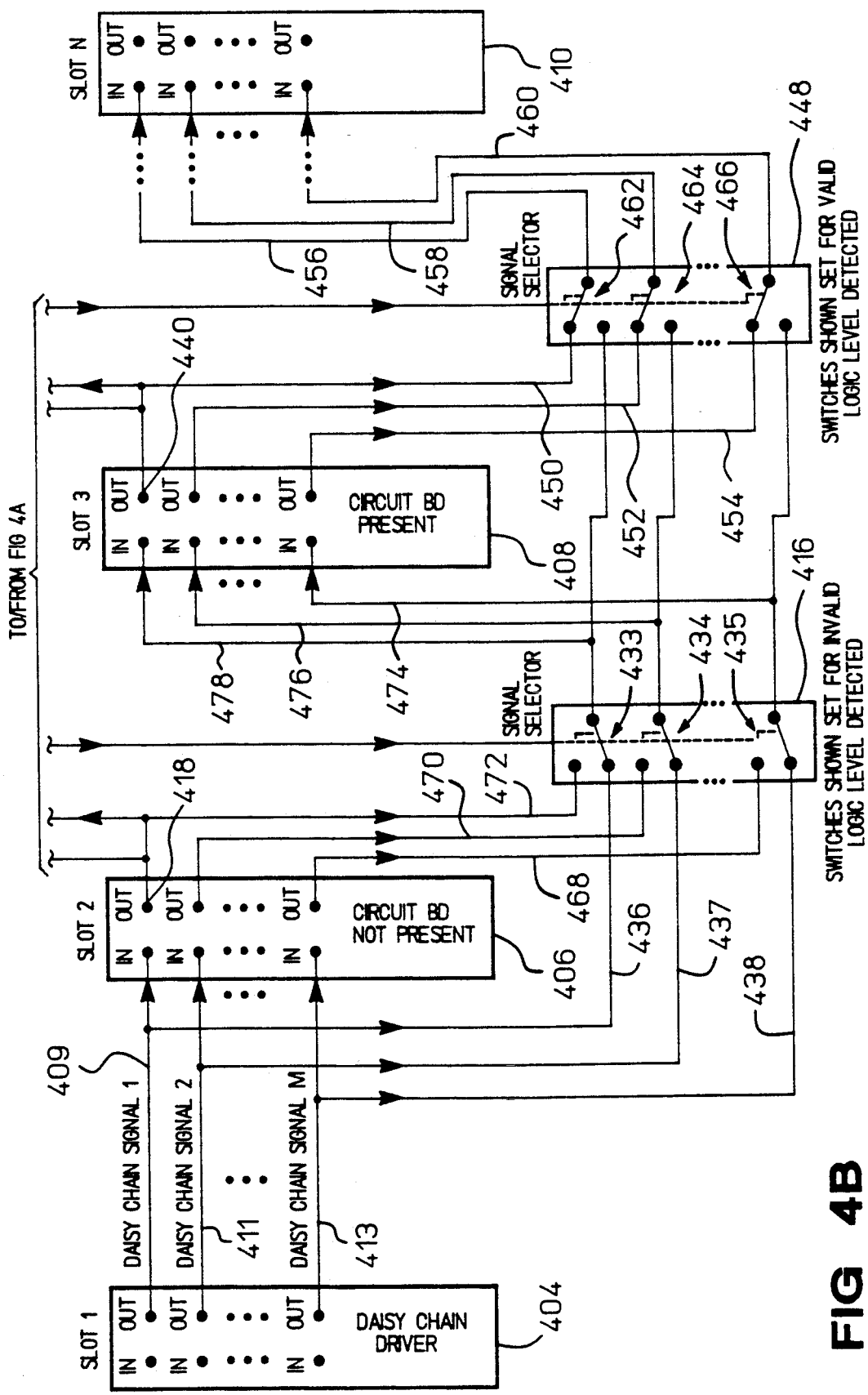

FIGS. 4A and 4B collectively show a block diagram of the present invention. In the discussion of the present invention that follows, reference will be made interchangeably to the foregoing FIGS. 4A and 4B.

In the preferred embodiment, the present invention can be envisioned as part of the backplane 102 interfacing the various connectors of slots 404-410 in FIG. 4B. The present invention envisions implementing an invalid logic level bias generator, a valid logic level detector, and a signal selector for each of the N slots, except the first constituent of the daisy-chain, slot 1, and the last constituent of the daisy-chain, slot N. The present invention will automatically maintain the continuity of any desired M daisy-chain signals 409-413, including the bus grant and interrupt acknowledge daisy-chains, whenever a circuit board is absent from a slot.

FIGS. 4A and 4B show merely an example to illustrate the functioning of the present invention either when a circuit board is present in a slot or when no circuit board is present in a slot. As hypothetically shown, no circuit board is interfaced to the slot 406 (slot 2), while a circuit board is interfaced to the slot 408 (slot 3).

Because no circuit board is present in slot 406, a jumper must be provided to bypass the slot 406 in order to maintain the daisy-chain. In other words, the slot 404 must be able to communicate with the slot 408.

The invalid logic level bias generator 412 continuously generates a signal defined as being in the invalid logic level range. The invalid logic signal could be a current or voltage signal depending on the logic design of the computer architecture.

The invalid logic level bias generator 412 continuously drives the invalid logic signal onto a particular output of each relevant slot. Thus, the generator 412 drives the invalid logic signal onto an output 418 of the slot 406 via a line 420. Among other things discussed below in more detail, resistors $R_4$-$R_4$ electrically isolate the particular outputs of the slots.

Worth noting is that in the preferred embodiment, the particular outputs connected to the invalid logic level bias generator 412 and, consequently, monitored by the present invention are daisy-chained. The output monitored on the slots monitored by the present invention can be any output which passes a digital signal within the defined logic parameters.

Also worth noting is that, in terms of hardware, an individual invalid logic level bias generator could exist for each of the slots to be monitored, not necessarily one generator 412 for all slots as shown in FIG. 4A.

Because no circuit board is present in slot 406, the invalid logic signal is inputted to the valid logic level detector 414 through a line 430. Upon receipt of the invalid logic signal, the valid logic level detector 414 infers that no circuit board is present in the slot 406.

The valid logic level detector 414 controls the signal selector 416 in accordance with the input signal on line 430. In the preferred embodiment, the invalid logic level bias generator 412 follows the truth table specified in Table A below when controlling the signal selector 416.

TABLE A

Truth Table For Valid Logic Level Detector

| Input | Output |
|---|---|
| High Logical Signal ("1") | Set Signal Selector For Valid Logic Level Detected ("valid control signal") |
| Invalid Logic Signal | Set Signal Selector For Invalid Logic Level Detected ("invalid control signal") |
| Low Logical Signal ("0") | Set Signal Selector For Valid Logic Level Detected ("valid control signal") |

The signal selector 416, as well as the other signal selectors of the computer architecture, has M parallel switching elements 433-435, as shown. The M switching elements 433-435 correspond to the M daisy chain signals at issue. The signal selector 416 will operate the M switching elements 433-435, in accordance with the control from the valid logic level detector 414 on a line 432.

Each of the M switching elements 433-435 are of the single pole, double throw type, which are well known in the art. More specifically, in one position, each of the M switching elements 433-435 serve as a jumper to thereby allow a daisy-chain signal to bypass an empty slot. The signal selector 416 concurrently adjusts all of the M switching elements 433-435 in this position when it receives an invalid control signal from the valid logic level detector 414. Hence, notwithstanding that no circuit board is present in slot 406 (slot 2), the M daisy-chain signals can bypass the slot 406 through lines 436, 437, and 438.

When the M switching elements 433-435 are in the other alternative position, the M switching elements 433-435 serve to connect the M daisy-chain outputs of one slot to the corresponding M daisy chain inputs of the next slot, as is normally the case in the conventionally manufactured backplane 102. The foregoing positioning of the M switching elements 433-435 is effectuated when a corresponding circuit board is present. This scenario is immediately discussed below.

As shown in FIG. 4B, a circuit board is present within slot 408. In this scenario, an invalid logic level signal is driven onto an output 440 through a line 422. The resistors $R_1$-$R_4$, particularly resistor $R_2$, limit the drive capabilities of the invalid logic level bias generator 412. As a result, the circuit board which is present in slot 408 has sufficient drive (current or voltage) to overdrive the invalid logic signal from the generator 412 and drive a valid logic level signal from the output 440 onto a line 444.

Upon reading the valid logic signal on line 444, the valid logic level detector 445 will control, via a line 446, a corresponding signal selector 448 pursuant to the Table A. Specifically, in the instant scenario, the signal selector 448 is informed that a valid logic signal is being outputted from the output 440. Accordingly, it is assumed that a circuit board exists in the slot 408 (slot 3). Moreover, the signal selector 448 will connect all of the M daisy-chain outputs 450-454 to the corresponding M daisy-chain inputs 45614 460 of the next slot, via M switching elements 464-466.

Figure 5:
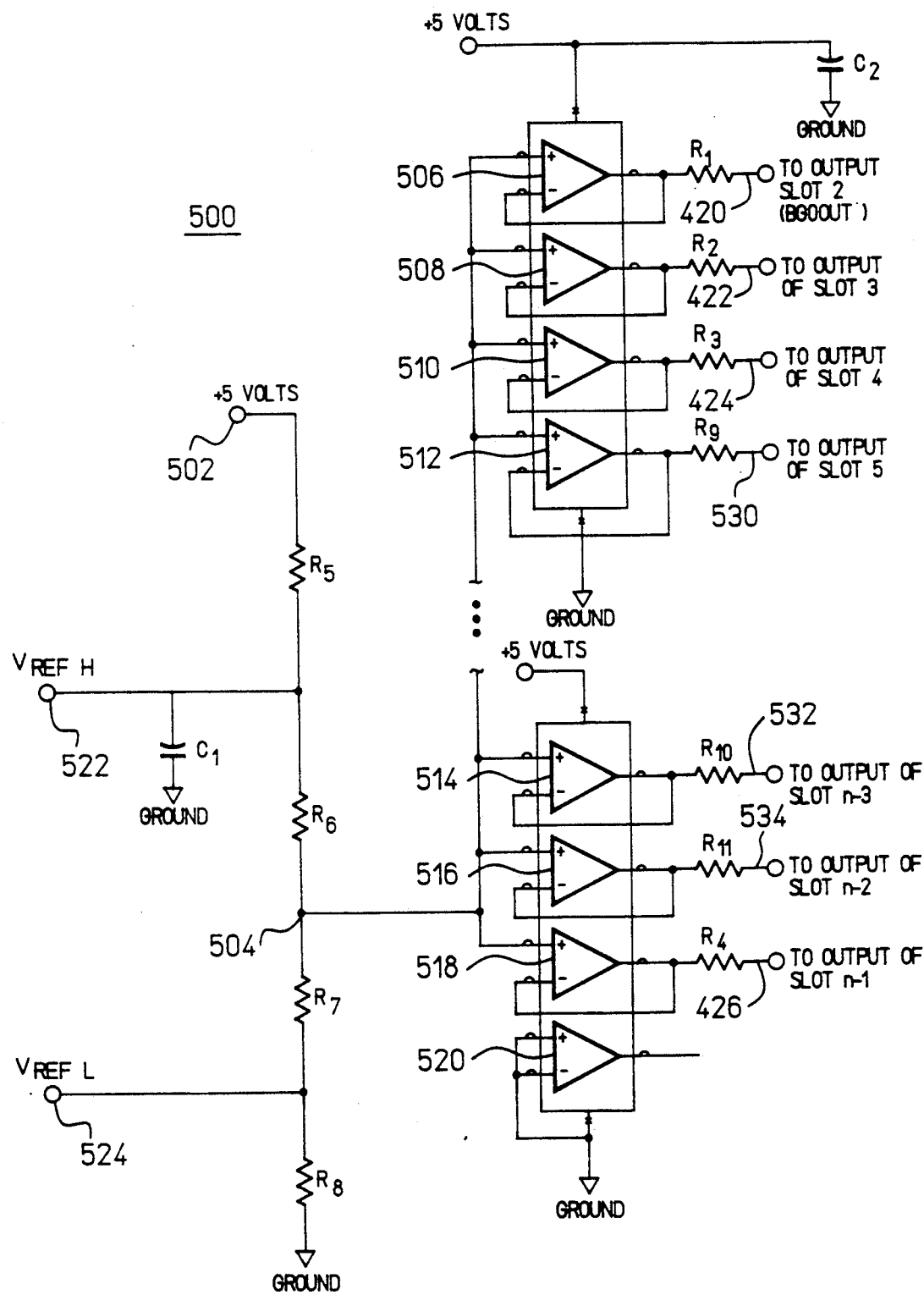
FIG. 5 is a low level block diagram of an invalid logic level bias generator utilized in the preferred embodiment.

FIG. 5 is a low level block diagram of an invalid logic level bias generator 412 utilized in the preferred embodiment. The invalid logic level bias generator 412 produces an invalid logic voltage signal in the invalid voltage range, which is defined in the VMEbus output specification as between 0.6 and 2.7 volts (in contrast, input specification: between 0.8 and 2.0 volts). In other words, if a voltage is less than or equal to 0.6 volts, then the signal is defined as and will be treated as a logic low signal ("0"). If a voltage is greater than or equal to 2.7 volts, then the signal is defined as and will be treated as a logic high signal ("1").

As shown, a +5 volt dc power source introduced at a node 502 along with a voltage divider comprised of resistors $R_5$ (280 ohms), $R_6$ (51.1 ohms), $R_7$ (51.1 ohms), and $R_8$ (110 ohms) defines at node 504 the voltage level of the invalid logic signal. Any variety of voltage divided may be implemented to long as it establishes an invalid logic signal within the invalid logic range. In the preferred embodiment, the combination of resistors is selected so that the resultant invalid logic voltage will be centralized within the invalid logic range.

The invalid logic voltage is next passed through a series of voltage followers 506-518 (520 is not used), also known in the art as buffer amplifiers or corresponds to each of the slots 2 to n−1. The voltage followers 506-518 provide for very high input impedance and very low output impedance, to thereby isolate the voltage divider circuit from the slots. In the preferred embodiment, the voltage followers 506-518 are the commercially available, model LM324N integrated circuit (IC) manufactured by National Semiconductor Corporation, Santa Clara, Calif., U.S.A.

Resistors $R_1$-$R_4$ and $R_9$-$R_{11}$ (4700 ohms) serve to limit the drive capabilities of the invalid logic level bias generator and also to aid in isolating, among each other, the invalid logic signals outputted from the generator 412.

As mentioned previously, any output of the slots may be monitored and the particular outputs which are monitored may vary from slot to slot. In the preferred embodiment, the invalid logic signal lines outputted in FIG. 5 are connected to the connectors on the slots of the VMEbus backplane as follows: line 420 to BG0OUT* of slot 2, line 422 to BG0OUT* of slot 3, . . ., and line 426 to BG0OUT* of slot n−1.

Worth noting is that the functionality of the voltage followers 506-520 could have been implemented with only one voltage follower. However, in the preferred embodiment, it was desired to isolate the invalid logic signals from each other.

As well known in the art, the capacitors $C_1$ and $C_2$ (0.1 microfarads) are merely inserted to help stabilize the +5 volt dc power sources.

Another feature of the generator of FIG. 5 is that a high reference voltage (refH) and a low reference voltage (refL) may be acquired from the voltage divider at respective nodes 522 and 524 if desired for some other purpose. In the preferred embodiment, these reference voltages are utilized in the valid logic level detector 414 to determine whether inputted signals are within either an invalid or a valid logic range. The usage is discussed in specific detail later in this document.

Furthermore, the high reference voltage is set arbitrarily to around 2.2 volts, while the low reference voltage is set arbitrarily to around 1.1 volts. These reference voltages insure that the a detected invalid voltage falls well within the invalid logic range of 0.6 volts to 2.7 volts as defined by the VMEbus output specification.

Hence, a very effective, extremely reliable, and inexpensive invalid logic level bias generator may be readily constructed from commercially available electronic parts.

Figure 6:
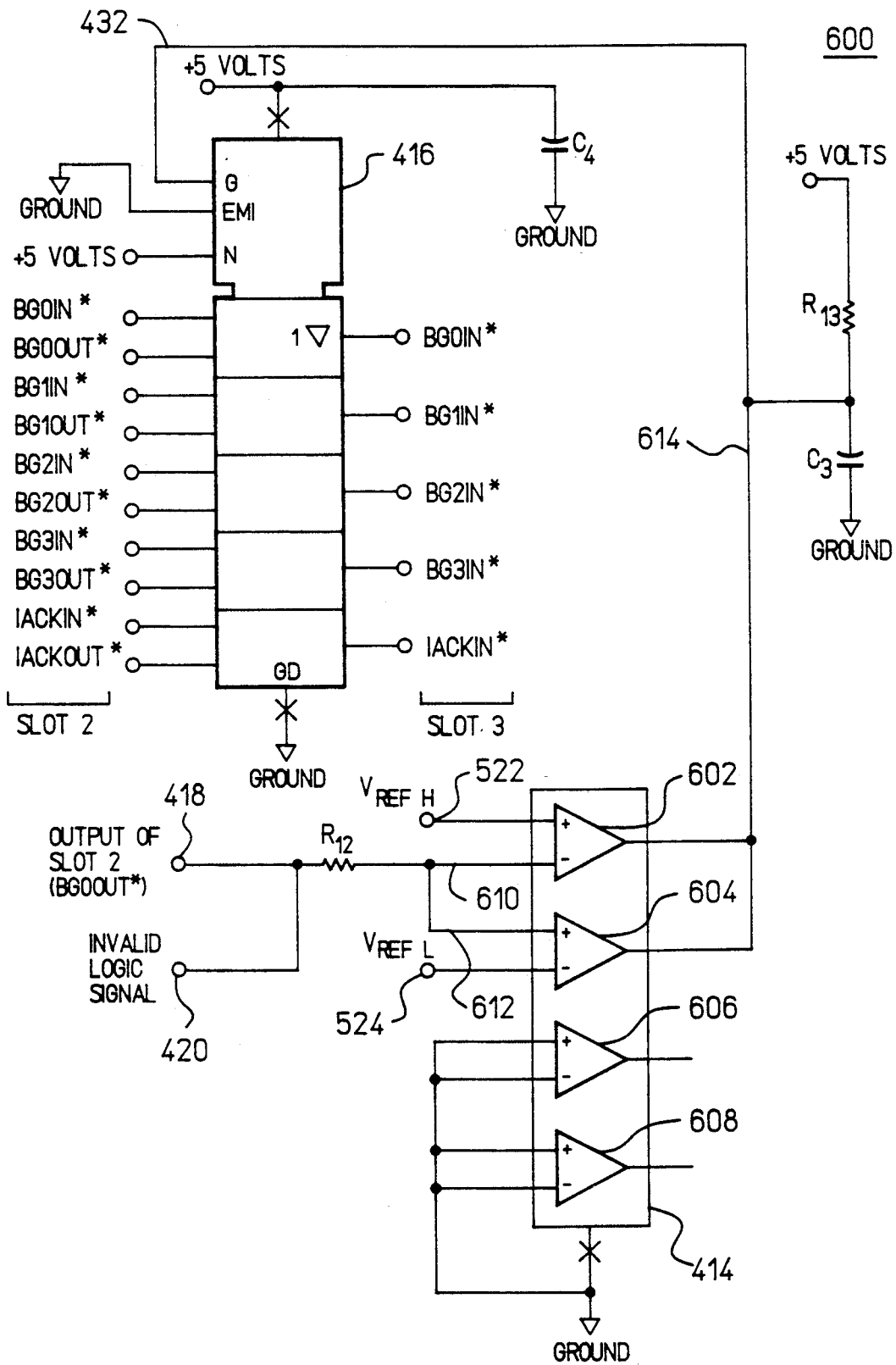
FIG. 6 is a low level block diagram of a valid logic level detector and a signal selector utilized in the preferred embodiment.

FIG. 6 is a low level block diagram of a valid logic level detector and a signal selector utilized in the preferred embodiment.

For discussion purposes, the valid logic level detector 414 and the signal selector 416, both corresponding to the slot 406 (slot 2), are illustrated in FIG. 6 and discussed in detail below. However, the teachings and features are equally applicable to the remaining slots which need to be monitored to maintain the daisy chain signals.

With reference to FIG. 6, the output BG0OUT* of slot 2 is connected at the reference numeral 418 along with the invalid logic signal line from the generator 412 at the reference numeral 420. If a logic signal resides on the output BG0OUT*, then the logic signal will be added to the invalid logic signal to thereby form a composite signal at line 430. However, the logic signal has enough power to essentially overdrive the invalid logic signal. Consequently, a logic signal will be present at line 430. Resistor R12 (4700 ohms) further stabilizes the circuit by attenuating the voltage at high frequencies when the two inputs are added to thereby insure that a proper logic signal is passed. The resistor R12 is not a critical requirement.

In contrast, if a logic signal does not reside on the output BG0OUT*, then the invalid logic signal will appear at line 430. Moreover, the resistor $R_{12}$ will not substantially effect the voltage signal due to the low current of the invalid logic signal.

Next, the signal path is divided as indicated by respective lines 610 and 612, and both lines are fed to the valid logic level detector 414. At the detector 414, the signal is examined to determine whether it falls within the range of either an invalid logic signal (1.1 v <signal <2.2 v) or a valid logic signal (signal 1.1 v or signal 2.2 v). As mentioned previously, the high reference voltage (refH) 522 and a low reference voltage (refL) 524 from the generator 412 are utilized in the valid logic level detector 414 to determine whether inputted signals are within either the invalid or valid logic range.

The electronic linkage of the reference voltages 522, 524, and 504 used in the valid logic level detector 414 and the invalid logic signal produced in the invalid logic level bias generator 412 is not necessary, and therefore, is not shown in FIGS. 4A and 4B. However, the purpose of the electronic linkage is to insure that no miscommunication occurs between the generator 412 and the detector 414 due to inherent, unavoidable voltage drifts.

The valid logic level detector 414 in the preferred embodiment is comprised of an model LM333N IC which is commercially available and manufactured by the National Semiconductor Corporation, Santa Clara, Calif., U.S.A. The LM339N IC has four comparators 602–608, but only the comparators 602 and 604 are utilized. The comparators 602 and 604 together implement the logic specified in Table A, shown hereinbefore, via independently comparing the signal to both the high reference voltage (refH) 522 and the low reference voltage (refL) 524. Whether the signal is either an invalid or valid logic signal is encoded on the binary logic control line 614 at the output of valid logic level detector 414.

A low pass filter comprised of a resistor $R_{13}$ (4700 ohms) and a capacitor $C_3$ (0.1 microfarads) is connected to the line 614. The low pass filter removes invalid logic signals which would be detected by the detector 414 when the circuit board connected to the output of slot 2 is transitionally changing from high to low, and vice versa.

Finally, the signal selector 416 switches the appropriate jumper lines based upon the signal on line 614. In the preferred embodiment, the signal selector 416 is a model 74F711 multiplexer (mux) IC made by Signetics, Inc., Sunnyvale, Calif., U.S.A. Conceptually, it comprises the switching elements 433–435 described in regard to FIGS. 4A and 4B. Moreover, as shown, a capacitor $C_4$ (0.1 microfarads) is utilized to stabilize the +5 volt dc power source used to power the 74F711 IC.

The foregoing description of the preferred embodiment of the present invention has been presented for purposes of illustration and description. It is not intended to be exhaustive or to limit the present invention to the precise form disclosed, and obviously many modifications and variations are possible in light of the above teachings. The particular embodiments were chosen and described in order to best explain the principles of the present invention and its practical application to those persons skilled in the art and to thereby enable those persons skilled in the art to best utilize the present invention in various embodiments and with various modifications as are suited to the particular use contemplated. It is intended that the scope of the present invention be broadly defined by the claims appended hereto.

I claim the following:

1. A system for determining whether valid digital information is present of a digital line based upon the analog nature of said digital line, the system comprising:
    a generator adapted to continuously drive an invalid logic signal onto said digital line, said invalid logic signal capable of being overdriven by a valid logic signal on said digital line; and
    a detector connected to said digital line and adapted to determine whether said valid logic signal is present on said digital line.

2. The system of claim 1, further comprising a signal selector responsive to said detector, said signal selector for connecting a first electrical path to a second electrical path when said valid logic signal is present on said digital line, said signal selector for connecting said first electrical path to a third electrical path when said invalid logic signal is present on said digital line.

3. The system of claim 1, further comprising a signal selector responsive to said detector, said signal selector for connecting said digital line to another circuit element when said valid logic signal is present on said digital line.

4. The system of claim 1, wherein said generator further comprises a voltage follower to isolate said generator from said detector.

5. The system of claim 1, wherein said invalid logic signal is a voltage which is generated by a voltage divider.

6. The system of claim 1, wherein said invalid logic signal is a current.

7. The system of claim 2, further comprising a low pass filter connected between said detector and said signal selector.

8. The system of claim 2, wherein said signal selector comprises one of the following: a relay, multiplexer, or switching element.

9. The system of claim 2, wherein said first electrical path resides within a daisy chain and wherein said signal selector maintains communication via said daisy chain.

10. The system of claim 5, wherein a low voltage reference and a high voltage reference are generated from said voltage divider and wherein said low voltage reference and said high voltage reference are utilized by said detector to determine whether said valid logic signal is present on said digital line.

11. The system of claim 9, wherein said daisy chain comprises an electrical line passing through circuit boards and slots within a microcomputer and wherein said digital line is an output from a slot.

12. The system of claim 10, wherein said detector further comprises first and second comparators, said first comparator for using said low voltage reference to recognize said valid logic signal in a low logical state, said second comparator for using said high voltage reference to recognize said valid logic signal in a high logical sate.

13. A system for automatically configuring the interconnection of circuit boards interfaced to a backplane in a computer to thereby maintain a daisy-chain configuration, the system comprising:
    generator means for continuously driving an invalid logic signal onto an output of a slot for a circuit board, said invalid logic signal capable of being overdriven by said output of said circuit board when said output comprises a valid logic signal;
    detector means for receiving said output and for determining whether said output is either within a predetermined valid logic range or a predetermined invalid logic range; and
    selector means responsive to said detector, said selector means for bypassing daisy-chain lines of said slot when said output resides within said predetermined invalid logic range, said selector means for connecting said daisy-chain lines of said slot within said daisy-chain when said output resides within said predetermined valid logic range.

14. The system of claim 13, wherein said generator means further comprises a voltage follower to isolate said generator means from said detector means.

15. The system of claim 13, wherein said invalid logic signal is a voltage which is generated by a voltage divider.

16. The system of claim 13, wherein said invalid logic signal is a current.

17. The system of claim 13, further comprising a low pass filter connected between said detector means and said selector means.

18. The system of claim 15, wherein a low voltage reference and a high voltage reference are generated from said voltage divider and wherein said low voltage reference and said high voltage reference are utilized by said detector means for determining whether said output is either within a predetermined valid logic range or a predetermined invalid logic range.

19. The system of claim 18, wherein said detector means further comprises first and second comparators, said first comparator for using said low voltage reference to recognize said output in said low valid logic range, said second comparator for using said high voltage reference to recognize said output in said high valid logic range.

20. A method for determining whether valid digital information is present on a digital line based upon the analog signal level of said digital line, the method comprising the steps of:
   (1) driving an invalid logic signal onto said digital line wherein said invalid logic signal is capable of being overdriven by a valid logic signal on said digital line;
   (2) detecting the signal level on said digital line;
   )3) determining whether said level falls within either a predefined invalid logic range of a predefined valid logic range; and
   (4) concluding that no valid digital information resides on said digital line when said signal level is determined to be within said predefined invalid logic range.

* * * * *